Patented Mar. 12, 1935

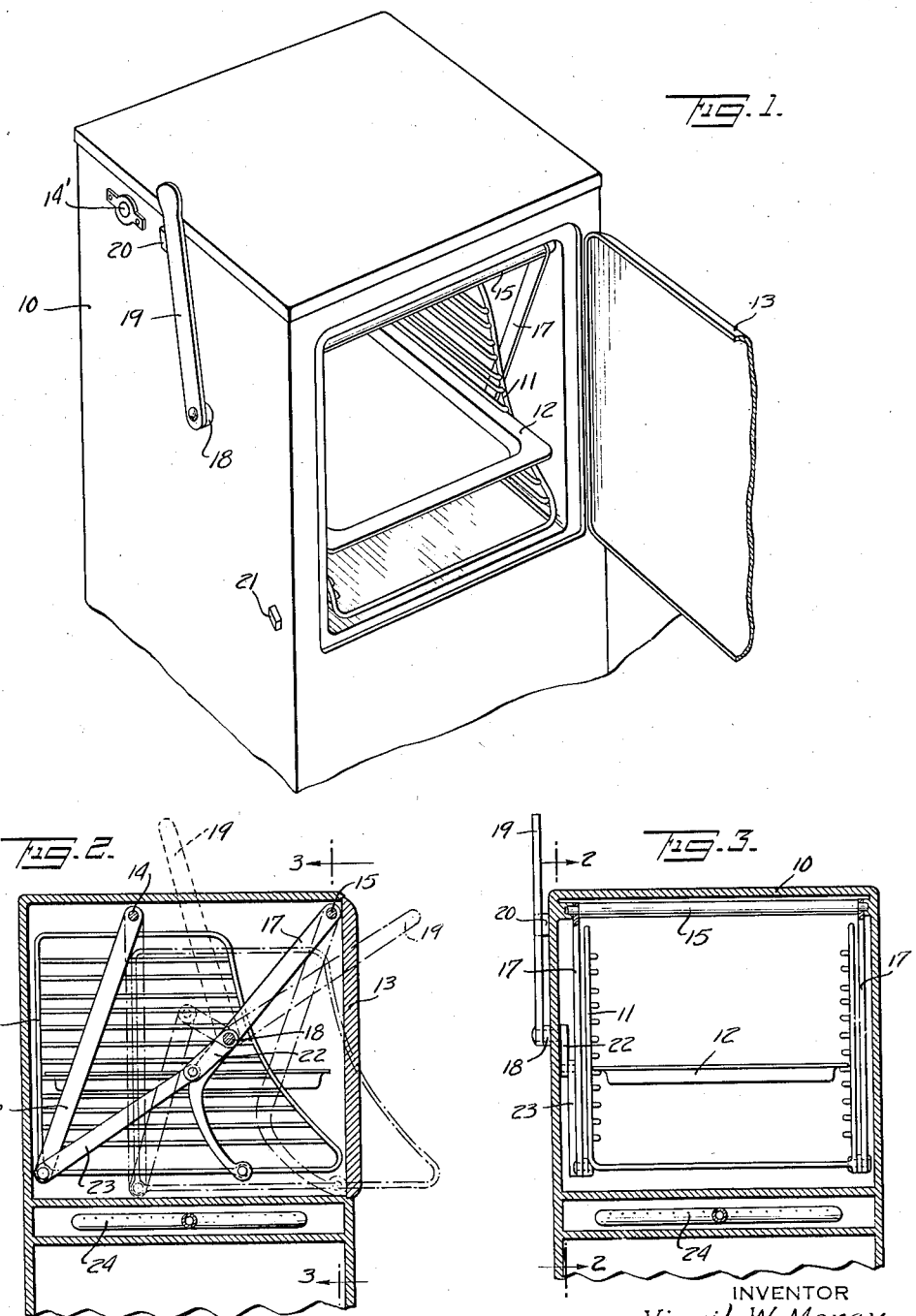

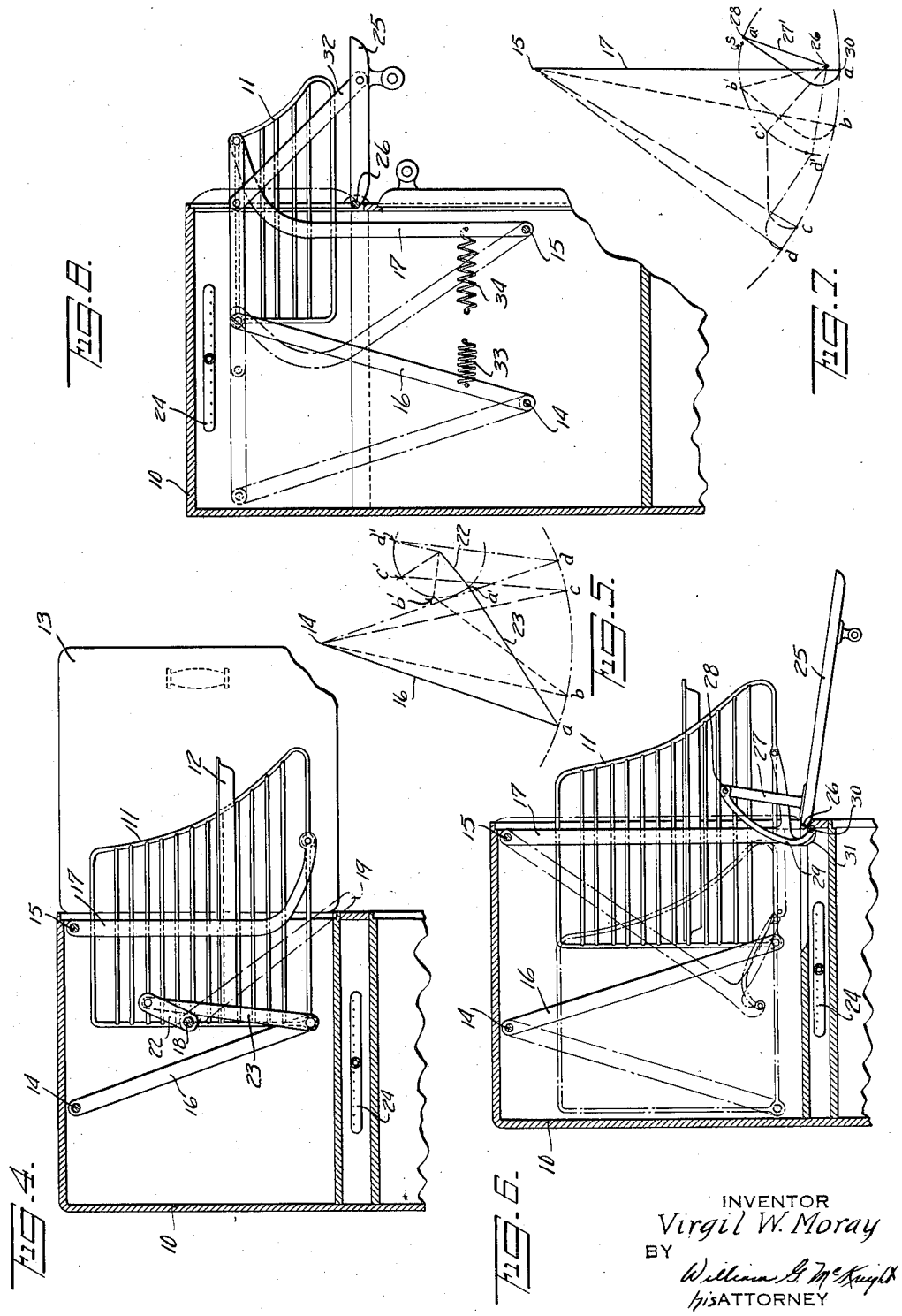

1,994,227

UNITED STATES PATENT OFFICE 1,994,227

MECHANICAL MOVEMENT DEVICE FOR OVENS AND THE LIKE

Virgil Willis Moray, New York, N. Y.

Application February 11, 1930, Serial No. 427,469

18 Claims. (Cl. 126—337)

My invention relates to mechanical movement and particularly to a system of levers employed to move a carriage into and out of a chamber.

One of the objects of my invention is to apply such a device to the oven of a gas stove or the like, the arrangement being such that the carriage will be moved into and out of the oven at varying speed even though the operating handle is moved at a constant speed. Specifically, the speed of the carriage is very slow at the beginning and at the end of its travel in either direction although the handle is moved at a constant rate.

Further objects and advantages will appear from the following description taken in connection with the accompanying drawings, which form a part of this specification and on which:

Fig. 1 is a perspective view of a preferred embodiment of my invention;

Fig. 2 is a cross-sectional view of the apparatus shown in Fig. 1 and is taken on the line 2—2 of Fig. 3;

Fig. 3 is a cross-sectional view taken on the line 3—3 of Fig. 2;

Fig. 4 is a cross-sectional view similar to Fig. 2 but with the carriage in full extended position;

Fig. 5 is a straight line diagram showing various positions of some of the elements shown in Figs. 1, 2, 3 and 4;

Fig. 6 is a cross-sectional view of a modified form of my invention;

Fig. 7 is a straight line diagram showing various positions of some of the elements shown in Fig. 6; and Fig. 8 is a cross-sectional view of a further modification.

Referring more particularly to Fig. 1 reference character 10 designates generally the oven of a gas stove. Within oven 10 is movably supported, as will hereinafter be described, a carriage 11 shown as comprising stiff wire members. Carriage 11 is adapted to removably support one or more trays 12 in which are placed food to be cooked. The front of oven 10 is provided with a hinged door 13.

Rotatably mounted near the upper part of oven 10 are two transverse rods 14 and 15. The bearings for these rods may be within the oven, as shown in Fig. 3 for rod 15, or they may be outside where they are subjected to a less degree of heat, as shown at 14' in Fig. 1. Supported by rod 14 are two arms 16, the lower ends of which are pivotally attached to the rear lower part of carriage 11. Supported by rod 15 are two arms 17, curved as shown, the lower ends of which are pivotally attached to the lower forward portion of carriage 11. It will be noted that a line drawn through the center of rod 15 and the point of attachment of arm 17 to carriage 11 is parallel to arm 16.

Journalled in one side of oven 10 is a pin 18. To the outer end of pin 18 is rigidly secured a handle 19. Stops 20 and 21 are provided on the outside of the oven to limit the movement of handle 19. To the inner end of pin 18 is rigidly secured a crank arm 22. A link 23 is pivotally connected to the end of crank arm 22 and to the lower rear part of carriage 11. The oven may be heated by suitable gas burner 24.

The operation of this embodiment of my invention is as follows:

Assuming the carriage to be in the position shown in full lines in Fig. 2, it will be seen that the weight of the carriage and whatever may be supported thereon will tend to move the carriage to the position shown in the dot and dash lines. However, such movement is prevented by the fact that, in this position, link 23 and crank arm 22 are not in a straight line and in order for the aforementioned movement to take place it would be necessary for crank arm 22 and handle 19 to rotate in a counter-clockwise direction. Such rotation is prevented by stop 20. However, if it is desired to move the carriage out of the oven door 13 is opened and handle 19 rotated in a clockwise direction. This causes crank arm 22 and link 23 to pass through dead-center or straight line position and to take the position shown by the dot and dash lines representing these members. Further movement of the handle to the position shown in Fig. 4 will cause carriage 11 to move to its full extended position. In this position the weight of the carriage will tend to return it to the intermediate position shown by the dot and dash lines in Fig. 2. In the full extended position, however, link 23 and crank arm 22 are just past dead-center or straight line position and hence such movement of the carriage tends to move handle 19 further in a clockwise direction but such movement is prevented by stop 21. When it is desired to return the carriage to the position shown in Fig. 2, the handle is moved in a counter-clockwise direction, thus moving crank arm 22 and link 23 through dead-center and to the position shown in dot and dash lines in Fig. 2 and finally to the position shown in full lines in the same figure.

The arrangement of the above described system of levers is such that, for a constant rate of movement of handle 19 the carriage moves from either extreme position, at first very slowly gaining a maximum speed in the intermediate position whereafter the rate is reduced to zero at the other end of the travel of the carriage. This motion is clearly apparent from Fig. 5, which is a straight line diagram representing the important elements of Figs. 1, 2, 3 and 4 in four different positions. In Fig. 5 carriage 11, arm 17 and handle 19 are omitted in order not to unduly complicate the drawings.

The position of the levers corresponding to the inner position of the carriage is represented by full lines, $a$ indicating the position of the lower end of arm 16. Rotation of crank 22 through a given angle from $a'$ to $b'$ causes arm 16 to move from $a$ to $b$. Further rotation of crank 22 through an equal angle to $c'$ causes arm 16 to move to $c$, while rotation of crank 22 to $d'$ moves arm 16 to $d$. Thus it is seen that constant rotation of crank 22 causes arm 16 to move slowly at first, as represented by the short distance from $a$ to $b$, then faster through its intermediate position, as represented by the comparatively long distance between $b$ and $c$, and finally to move slowly through the last part of its travel, as indicated by the short distance between $c$ and $d$. The advantage of this, particularly in connection with an oven, is that tray 12 carried by carriage 11 often contains a roast or the like and basting water or juices given off therefrom during the cooking process. If the tray were moved rapidly from a position of rest or stopped suddenly the inertia of the liquid juices in tray 12 would cause them to splash over the ends of the tray and, in the case of suddenly stopping the movement of the carriage, the entire tray and its contents might be projected from the carriage. However, with my improved device it is impossible to rapidly accelerate or decelerate the carriage when the latter is near either extreme of its travel regardless of how carelessly handle 19 may be manipulated.

In Fig. 6 is shown a modification of my invention wherein door 25 replaces handle 19, the arrangement being such that whenever the door is opened carriage 11 is moved to its extended position, being returned to within the oven when the door is closed. Carriage 11 is supported by arms 16 and 17 which are pivotally supported by rods 14 and 15 respectively. In this modification the form of arm 17 is somewhat different than that shown in Figs. 2, 3 and 4. However, the line drawn through the center of rod 15 and through the point of attachment of arm 17 to carriage 11 is parallel to rod 16, as it is in the previously described modification. Door 25 is hinged to the oven at 26 and is slightly below the horizontal when fully open. Rigidly secured at right angles to door 25 is arm 27, which corresponds in some respects to crank arm 22. Pivotally attached to the end of arm 27 at 28 is a link 29, the other end of which is pivotally attached at 30 to a projection 31 formed on arm 17. Door 25 opens to slightly below the horizontal so that it and arm 27 may swing through an arc greater than 90°.

It will be noted that a line drawn through the points 26 and 30 will pass slightly to the left of point 28, as now clearly appears in Fig. 7, which shows diagrammatically various positions of important members of Fig. 6, arm 16 and carriage 11 being omitted and door 25 and arm 27 represented by a single straight line 27' which connects points 26 and 28. Hence, the tendency for the carriage to move from the position shown in full lines to intermediate position, which tendency results from its weight, will tend to cause rotation of arm 27, and hence door 25 represented in Fig. 7 by line 27' in a clockwise direction, as point 28 is past dead-center or straight line position, indicated at $s$ in Fig. 7. Such rotation is prevented by the lower side of the door to the right of point 26 being in contact with a part of the stove. However, when door 25 is moved in a counter-clockwise direction towards its closed position link 29 will cause arm 17 and hence carriage 11 to move to the left as viewed in Fig. 5. When the door is completely closed the various members will be in the position shown by the dot and dash lines. In this position it will be noted that arm 27 and link 29 have passed dead-center or straight line position and that the weight of the carriage tending to move the carriage to an intermediate position tends to rotate arm 27 and hence door 25 in a counter-clockwise direction. This, of course, is prevented by the fact that the door is already fully closed and can move no further in this direction. The fact that door 25 and arm 27 swing through an arc slightly greater than 90° allows point 28 to pass dead-center at either end of its arc of travel.

In this modification, as in the previous one, the movement of the carriage is very slow near its extreme positions while a maximum speed is reached while passing through its intermediate position. From Fig. 7 it is seen that equal increments of movement of door 25 and arm 27, as from $a'$ to $b'$, from $b'$ to $c'$ and from $c'$ to $d'$ cause unequal increment of movement of arm 17 from $a$ to $b$, from $b$ to $c$ and from $c$ to $d$, respectively. The weight of the carriage insures that point 30 moves the left after point 28 has passed $s$, instead of to the right as it otherwise might.

In Fig. 8 is shown a further modification of my invention wherein arms 16 and 17 are pivoted to the oven at a point below carriage 11 instead of above it. As before, arms 16 and 17 are pivotally mounted on rods 14 and 15 respectively but are attached to the upper part of carriage 11 instead of to the lower part. Door 25 pivoted at 26 is connected to the upper part of carriage 11 by link 32. A pair of tension springs 33 and 34 are secured to the oven and to arms 16 and 17, respectively, as shown.

With the carriage 11 in the full extended position shown by full lines in Fig. 8 the tendency of the carriage to move further out of the oven due to its weight is resisted by the door 25 which is prevented from further movement in a clockwise direction. When it is desired to return the carriage to a position within the oven, door 25 is closed. This causes carriage 11 to move back into the oven to the position shown by the dot and dash lines. Further movement of the carriage, due to gravity, is prevented as link 32 is now in a straight line with the top of the carriage and in order for further movement of the latter to take place it would be necessary that door 25 be moved further in a counter-clockwise direction which is impossible as the door is already fully closed.

In this modification the movement of the carriage from either extreme position takes place at a substantially constant rate, assuming the rate of movement of the door to be constant. Springs 33 and 34 are provided to cushion the movement of the carriage, particularly in case the door is released just after the carriage has passed its intermediate position, in which case the weight of the carriage would act to carry it to its extreme position. These springs also have a tendency to reduce the rate of motion of the carriage and the door when near either extreme position.

While I have described several more or less specific embodiments of my invention it is to be understood that modifications thereof fall within its scope. The drawings have been made to scale, the lengths of the various members and distances between the centers having been so chosen as to give very good results but these lengths and distances may be varied without departing from the spirit of my invention. Also, the device described may be applied to other uses than in connection with stoves, for instance the device may be employed to support storage batteries in a radio set. My invention is to be limited only by the appended claims viewed in the light of the prior art.

What I claim is:

1. In a stove, means forming an oven, a movable carriage in said oven, a lever pivoted to said means, and means comprising link mechanism connecting said lever with said carriage whereby constant movement of said lever through an arc of approximately ninety degrees causes first acceleration and then deceleration of said carriage.

2. In a stove, means forming an oven, a movable carriage in said oven, a lever pivoted to said means, and means comprising link mechanism connecting said lever with said carriage whereby constant movement of said lever causes varying movement of said carriage, said varying movement increasing as said carriage moves from either extreme position toward its intermediate position and said last mentioned means securing said carriage in either extreme position.

3. In a stove, means forming an oven, a movable carriage in said oven, a lever pivoted to said means, and means comprising link mechanism connecting said lever with said carriage whereby constant movement of said lever causes varying movement of said carriage and said last mentioned means securing said carriage in either of the extreme positions of said carriage.

4. In a stove, in combination, means for forming an oven, a carriage, rods mounted transversely on said oven, arms mounted on said rods and pivotally attached to said carriage for movably supporting said carriage, a crank journalled on said oven, a link pivotally connected to said crank and to said carriage, a handle secured to said crank, said link and said crank constituting means whereby a constant movement of said handle through an arc of approximately ninety degrees causes first acceleration and then deceleration of said carriage.

5. In a stove, in combination, means forming an oven, a carriage movably mounted in said oven, a lever pivoted to said oven and a link connecting said lever with said carriage, said lever and said link constituting means whereby movement of said lever at a constant rate through an arc of approximately ninety degrees causes said carriage to first accelerate and to then decelerate.

6. In a stove, in combination, means forming an oven, a carriage movably mounted in said oven, a lever pivoted on said oven and a link connecting said lever with said carriage, said lever and said link constituting means for causing said carriage to move at a varying rate which increases from either extreme position of the carriage to a maxium near the intermediate position upon constant movement of said lever through an arc of approximately ninety degrees.

7. In a stove, in combination, means forming an oven a carriage movably mounted in said oven, a lever pivoted on said oven and a link connecting said lever with said carriage, said lever and said link being arranged so that movement of said lever at a constant rate causes said carriage to move at a varying rate which increases from either extreme position of the carriage to a maximum near the intermediate position and said lever and said link constituting means for locking said carriage in either extreme position.

8. In a stove, in combination, means forming an oven a carriage movably mounted in said oven, a door hinged to said oven for closing the same and link mechanism operatively connecting said door with said carriage for moving said carriage into and out of said oven, said mechanism constituting means for moving said carriage at a rate varying with respect to the rate of said door so that the movement of said carriage is slower near its extreme positions than near its intermediate position and for securing said carriage in either extreme position.

9. In a stove, in combination, means forming an oven, a carriage movably mounted in said oven, a door hinged to said oven for closing the same, link mechanism operatively connecting said door with said carriage and constituting means for causing a varying movement of said carriage which increases from either extreme position of the carriage to a maximum near the intermediate position upon constant movement of said door through an arc of approximately ninety degrees.

10. In a stove, in combination, means forming an oven, a carriage, rods mounted transversely of said oven, arms mounted on said rods and pivotally attached to said carriage for movably supporting said carriage, a door hinged to said oven for closing the same, a member secured to said door and a link pivotally connected to one of said arms and to said member and so arranged that a constant movement of said door imparts a gradually varying movement to said carriage.

11. In a stove, in combination, means forming an oven, a carriage, rods mounted transversely of said oven, arms mounted on said rods and pivotally attached to said carriage, a door hinged to said oven for closing the same, a member secured to said door and a link pivotally connected to one of said arms and to said member and so arranged that a constant movement of said door imparts a varying movement to said carriage which increases from either extreme position of the carriage to a maximum near the intermediate position.

12. In a stove, in combination, means forming an oven, a carriage movably mounted in said oven, a door hinged to said oven for closing the same and link mechanism operatively connecting said door with said carriage for moving said carriage into and out of said oven, said link mechanism arranged to pass dead-center near either end of its range of movement and thus automatically lock said carriage in either extreme position.

13. In a stove, in combination, means forming an oven, a carriage movably mounted in said oven, a door hinged to said oven for closing the same, link mechanism operatively connecting said door with said carriage for moving said carriage into and out of said oven, said link mechanism arranged to pass dead-center near either end of its range of movement and means limiting the range of movement of said door.

14. In a stove, means forming an oven, a movable carriage in said oven, means for movably supporting said carriage comprising supporting members pivotally attached to said carriage and pivotally supported above the point of attachment to said carriage whereby movement of said carriage is constrained to an arcuate path, the intermediate point of said path being lower than either of the ends, and means for moving said carriage through said path.

15. In a stove, means forming an oven, a movable carriage in said oven, means for movably supporting said carriage comprising supporting members pivotally attached to said carriage and pivotally supported above the point of attachment to said carriage whereby movement of said carriage is constrained to an arcuate path, the intermediate point of said path being lower than either of the ends, and means for moving said carriage through said path at a varying rate.

16. In a stove, means forming an oven, a movable carriage in said oven, means for movably supporting said carriage comprising supporting members pivotally attached to said carriage and pivotally supported above the point of attachment to said carriage whereby movement of said carriage is constrained to an arcuate path, the intermediate point of said path being lower than either of the ends, and means for moving said carriage through said path at a rate which varies from a maximum at the intermediate point to a minimum at either end.

17. In a stove, in combination, means forming an oven, a carriage movably mounted in said oven, a door hinged to said oven for closing the same, link mechanism operatively connecting said door with said carriage whereby opening of said door causes said carriage to move out of said oven and closing of said door causes said carriage to move into said oven, the weight of said carriage acting to maintain said link mechanism under stress when said door is in closed position, said stress being so directed as to tend to retain said door in closed position.

18. In a stove, in combination, means forming an oven, a carriage movably mounted in said oven, a door hinged to said oven for closing the same, link mechanism operatively connecting said door with said carriage and so arranged that a constant movement of said door imparts first an accelerating and then a decelerating movement to said carriage, the weight of said carriage acting to maintain said link mechanism under stress when said door is in closed position, said stress being so directed as to tend to retain said door in closed position.

VIRGIL WILLIS MORAY.